United States Patent [19]
Burnham

[11] Patent Number: 5,417,861
[45] Date of Patent: * May 23, 1995

[54] PROCESS TO STABILIZE BIOORGANIC, RAW OR TREATED WASTEWATER SLUDGE

[75] Inventor: Jeffrey C. Burnham, Maumee, Ohio

[73] Assignee: N-Viro International Corporation, Toledo, Ohio

[*] Notice: The portion of the term of this patent subsequent to Jan. 4, 2011 has been disclaimed.

[21] Appl. No.: 170,705

[22] Filed: Dec. 21, 1993

Related U.S. Application Data

[63] Continuation-in-part of Ser. No. 839,485, Feb. 20, 1992, Pat. No. 5,275,733, which is a continuation of Ser. No. 621,221, Nov. 30, 1990, Pat. No. 5,135,664.

[51] Int. Cl.$^6$ .............................................. C02F 11/16
[52] U.S. Cl. .................................. 210/609; 71/9; 71/13; 71/22; 210/613; 210/631; 210/667; 210/710; 210/751; 210/752; 210/764; 210/916
[58] Field of Search ...................... 71/9, 12, 13, 21, 22, 71/63; 210/609, 613, 631, 710, 713, 751, 752, 764, 916, 667

[56] References Cited

U.S. PATENT DOCUMENTS

| | | | |
|---|---|---|---|
| 3,345,288 | 10/1967 | Sontheimer | 210/609 |
| 3,837,872 | 9/1974 | Conner | 106/74 |
| 4,108,771 | 8/1978 | Weiss | 210/916 |
| 4,249,929 | 2/1981 | Kneer | 71/9 |
| 4,270,279 | 6/1981 | Roediger | 34/9 |
| 4,655,932 | 4/1987 | Roslowski | 210/751 |
| 4,659,472 | 4/1987 | Nordlund et al. | 71/9 |
| 4,781,842 | 11/1988 | Nicholson | 210/751 |
| 4,793,927 | 12/1988 | Meehan et al. | 210/751 |
| 4,902,431 | 2/1990 | Nicholson et al. | 210/751 |
| 4,997,572 | 3/1991 | Wurtz | 210/710 |
| 5,013,458 | 5/1991 | Christy | 210/751 |
| 5,051,031 | 9/1991 | Schumacher | 210/751 |
| 5,087,375 | 2/1992 | Weinwurm | 210/751 |
| 5,125,951 | 6/1992 | Lohoda et al. | 71/63 |
| 5,135,664 | 8/1992 | Burnham | 210/751 |
| 5,275,733 | 1/1994 | Burnham | 210/609 |

OTHER PUBLICATIONS

"Lime Stabilization of Primary Sludge", Joseph B. Farrell et al, Jan. 1974.
"Process Design Manual for Sludge Treatment and Disposal" EPA 625/1-79-011, 1979.

Primary Examiner—Peter A. Hruskoci
Attorney, Agent, or Firm—Barnes, Kisselle, Raisch, Choate, Whittemore & Hulbert

[57] ABSTRACT

A method for treating bioorganic or raw or treated wastewater sludge so that a stability based upon achieving a significant microbial population, conductivity level and percent solids, is developed rapidly, is provided for indefinitely and is independent of climatic conditions. A dewatered sludge that has not been treated (i.e., raw) or a sludge that has been treated to a PSRP level or a sludge that has been treated to a PFRP level, i.e., pasteurized or sterilized sludge when still in a wet condition, i.e., between 12%–30% solids, or when in a dry condition, i.e., between 30–60% solids, is mixed with alkaline adsorptive materials to reduce odor, to increase the percent solids and to facilitate granulation, is adjusted to a mildly alkaline pH, and is adjusted to an ionic conductivity which will allow the sludge to mature rapidly when seeded with a beneficiating microbial flora. This process will reduce the pH or a high alkaline treated sludge, e.g., often above pH 12, to a physiological pH of between 7 and 9.5 or will raise the pH of a treated acid sludge to a similar range so that microbial activity can proceed to facilitate stability. Heat may be applied to the mixture to accelerate the carbonation and aid the overall drying process. The granular product, substantially due to its active microbial population, is useful as an agricultural product and topsoil blend.

27 Claims, 14 Drawing Sheets

EFFECT OF BLENDING AGRICULTURAL SOIL INTO A STERILE SLUDGE: AVERAGE NUMBER OF BACTERIA PER GRAM DRY SLUDGE SOLIDS AFTER AGING 7 DAYS pH PROCESSING OF ALKALINE PASTEURIZED SLUDGE IN THE ROTARY DRUM APPARATUS

PROCESS TO STABILIZE BIOORGANIC, RAW OR TREATED WASTEWATER SLUDGE

This application is a continuation-in-part of application Ser. No. 07/839,485, filed Feb. 20, 1992, now U.S. Pat. No. 5,275,733, which was a continuation-in-part of application Ser. No. 07/621,221, filed Nov. 30, 1990, now U.S. Pat. No. 5,135,664.

This invention relates to treatment of bioorganic and/or waste water sludge.

DEFINITIONS

1. Process to Significantly Reduce Pathogens (PSRP) (Established CFR 257, Sep. 13, 1979)

PSRP is the minimum disinfection and stabilization requirement of U.S. Environmental Protection Agency. Processes so classified, i.e., aerobic digestion, anaerobic digestion, lime stabilization (pH>12 for two hours), produce sludges which may be land filled or land applied on non-food chain crops with stringent public access restrictions and grazing restrictions. Such processes must demonstrate ability to reduce pathogen concentrations by 90%. As set forth in the specification of the U.S. Pat. No. 4,902,431, in a Nov. 6, 1985 memorandum, the EPA indicated that to qualify a process as a PSRP one must demonstrate that the process reduces animal viruses by one log and pathogenic bacterial densities by at least two logs and must reduce the vector attractiveness such that vectors, like flies or rats, are not attracted to the sludge.

2. Process to Further Reduce Pathogens (PFRP) (Established 40 CFR 257, Sep. 13, 1979)

PFRP is the most stringent criteria established by U.S. EPA for disinfection and stabilization of sewage sludges. Processes so classified must demonstrate the ability to reduce pathogen concentrations below detectable levels. Processes directly identified in 40 CFR 257 were compost, heat drying (>80° C.+moisture content below 10%), and heat treatment (>180° C. for 30 minutes).

"Add-on" processes such as high heat pasteurization: sludge is maintained for at least 30 minutes at a minimum temperature of 70° C., if added to PSRP processes, were deemed as Processes to Further Reduce Pathogens in 40 CFR 257. As indicated in the documents hereinafter referred to, approval that has been given to "add-on" processes has been limited to a caveat that:

to prevent regrowth and recontamination of the pathogenic organisms, the treated sludge must be maintained at pH 12 until land applied.

At the time of publication of 40 CFR 257, no criteria were established for PFRP processes.

As indicated in U.S. Pat. No. 4,902,431, on Nov. 6, 1985, the EPA issued a memorandum indication that to qualify a process as PFRP one must demonstrate reduction of pathogenic bacteria, animal viruses, and parasites "below detectable limits" of one (1) plaque forming unit (PFU) per 100 ml of sludge for animal viruses; three (3) colony forming units (CFU) per 200 ml of sludge for pathogenic bacterial (Salmonella sp); and one (1) viable egg per 100 ml of sludge for parasites (Ascaris sp.). Vector attractiveness must also be reduced for PFRP.

NOTE: PFRP regulations do not require the survival of any non-pathogenic organisms. In fact, many PFRP processes result in sterilization, i.e., the destruction of all microorganisms.

3. Land Application

Land application is the traditional method of sludge utilization. PSRP sludges are a minimum requirement, but may only be used on secure fields with substantial restrictions. Public access is prohibited with PSRP sludges. PFRP has no restrictions.

4. Disinfection

Disinfection is the destruction of pathogens, i.e., disease causing microorganisms, to some quantitative level.

5. Stabilization

Used in two ways:
a. The ability of a process to maintain levels of disinfection by preventing pathogen regrowth.
b. The ability of a process to reduce odors and to prevent odor redevelopment.

6. Sterilization

Sterilization is the complete destruction of all microorganisms in a substance.

7. Pasteurization - Conventional definition

Pasteurization is the destruction of all pathogenic microorganisms except bacterial spores.

8. Adsorptive Material

Adsorptive material is a material capable of binding organic and inorganic substances to its surface.

9. USEPA

United States Environmental Protection Agency.

10. Yard waste

Mechanically ground vegetation, wood chips, leaves and grass clippings

11. Green Waste

Any vegetative waste including yard waste or agricultural crop remains and either green or woody vegetation remains 12. Bioorganic sludge An organic sludge comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products, sludges resulting from the growth of microorganisms for the production of chemicals and organics, industrial sludges and by-products resulting from the production of microbial products and foodstuffs, sludges resulting from the animal slaughter industry—particularly if these are digested or otherwise broken down by microorganisms.

13. Organic sludge

A sludge derived from industrial products and by-products that are comprised in the majority of microbially degradable organic materials not of biological or microbiological origin. This definition includes sludges comprised of recycled organic products such as recycled paper and paper products.

BACKGROUND OF THE INVENTION

With the alternatives for bioorganic and/or wastewater sludge processing changing because of the public awareness of the problems of sludge dumping, either in landfills or oceans, the treatment of bioorganic and/or wastewater [municipal] sludges by a sterilization or a pasteurization process is becoming increasingly common so that it is safe for exposure to the public as a product. Unfortunately many of these treated sludges do not possess a long term stability against the formation of noxious odors and or the regrowth of a pathogenic micro flora which would pose a potential and significant public health threat. The present invention introduces a long term stability to such treated bioorganic and/or wastewater sludges as well as untreated bioorganic and/or wastewater sludges, e.g., raw primary or secondary sludges.

The United States Environmental Protection Agency (EPA) has promulgated rules governing the type of processes that an be used to treat wastewater sludge.

Under 40 CFR 257, a Process to Further Reduce Pathogens (PFRP) must be used where sewage sludge or septic tank pumping are to be applied to a land surface or are incorporated into the soil, and crops for direct human consumption are to be grown on such land within eighteen (18) months subsequent to application or incorporation.

A Process to Significantly Reduce Pathogens (PSRP) must be used where sewage sludge or septic tank pumping are to be applied to a land surface or incorporated into the soil and the public will have access to such land within twelve (12) months subsequent to application or incorporation, or grazing animals, whose products are consumed by humans, will have access to such land within one (1) month subsequent to application or incorporation.

40 CFR 257 classifies the following as PSRP and PFRP processes:

A. Processes to Significantly Reduce Pathogens

Aerobic digestion: The process is conducted by agitating sludge with air or oxygen to maintain aerobic conditions at residence times ranging from 60 days at 15° C. to 40 days at 20° C., with a volatile solids reduction of at least 38 percent.

Air Drying: Liquid sludge is allowed to drain and/or dry on under-drained sand beds, or paved or unpaved basins in which the sludge is at a depth of nine inches. A minimum of three months is needed, two months of which temperatures average on a daily basis above 0° C.

Anaerobic digestion: The process is conducted in the absence of air at residence times ranging from 60 days at 20° C. to 15 days at 35° C. to 55°, with a volatile solids reduction of at least 38 percent.

Composting: Using the within-vessel, static aerated pile or windrow composting methods, the solid waste is maintained at minimum operating conditions of 40° C. for 5 days. For four hours during this period the temperature exceeds 55° C.

Lime Stabilization: Sufficient lime is added to produce a pH of 12 after 2 hours of contact.

Other methods: Other methods of operating conditions may be acceptable if pathogens and vector attraction of the waste (volatile solids) are reduced to an extent equivalent to the reduction achieved by any of the above methods.

B. Process to Further Reduce Pathogens

Composting: Using the within-vessel composting method, the solid waste is maintained at operating conditions of 55° C. or greater for three days. Using the static aerated pile composting method, the solid waste is maintained at operating conditions of 55° C. or greater for three days. Using the windrow composting method, the solid waste attains a temperature of 55° C. or greater for at least 15 days during the composting period. Also, during the high temperature period, there will be a minimum of five turnings of the windrow.

Heating drying: Dewatered sludge cake is dried by direct or indirect contact with hot gases, and moisture content is reduced to 10 percent or lower. Sludge particles reach temperatures will in excess of 80° C. or wet bulb temperature of the gas stream in contact with the sludge at the point where it leaves the dryer is in excess of 80° C.

Heat treatment: Liquid sludge is heated to temperatures of 180° C. for 30 minutes.

Thermophilic Aerobic Digestion: Liquid sludge is agitated with air or oxygen to maintain aerobic conditions at residence times of 10 days at 55°–60° C., with a volatile solids reduction of at least 38 percent.

Other methods: Other methods of operating conditions may be acceptable if pathogens and vector attraction of the waste (volatile solids) are reduced to an extent equivalent to the reduction achieved by any of the above methods.

Any of the processes listed below, if added to the processes described in Section A above, further reduce pathogens. Because the processes listed below, on their own, do not reduce the attraction of disease vectors, they are only add-on in nature.

Beta ray irradiation: Sludge is irradiated with beta rays from an accelerator at dosages of at least 1.0 megarad at room temperature (ca. 20° C.).

Gamma ray irradiations: Sludge is irradiated with gamma rays from certain isotopes, such as $^{60}$Cobolt and $^{137}$Cesium, at dosages of at least 1.0 megarad at room temperature (ca. 20° C.).

Pasteurization: Sludge is maintained for at-least 30 minutes at a minimum temperature of 70° C.

Other methods: Other methods of operating conditions may be acceptable if pathogens are reduced to an extent equivalent to the reduction achieved by any of the above add-on methods.

In U.S. Pat. Nos. 4,781,842 and 4,902,431 there is disclosed processes wherein:

wastewater sludge containing odor, animal viruses, pathogenic bacteria, and parasites is treated to provide a fertilizer for agricultural lands which can be applied directly to the lands which consists essentially of the following steps:

mixing said sludge with at least one alkaline material, wherein the amount of added material mixed with said sludge being sufficient to raise the pH of said mixture to 12 and above for at least one day;

and drying said mixture to produce a granular material, the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacterial therein no less than three colony forming units per 100 ml of said sludge; to reduce parasites therein to less than one viable egg per 100 ml of said sludge; to reduce vector attraction to said sludge; and to prevent significant regrowth of the pathogenic microorganisms.

In these processes, the alkaline material may comprise lime, cement kiln dust or lime kiln dust or other alkaline materials and the PFRP status may be obtained by using treatment processes described as Alternative 1 or Alternative 2 in the above mentioned U. S. Pat. No. 4,902,431.

Other processes for treating wastewater sludge have utilized the concept of raising the pH in combination with high heat, e.g., greater than 70° C., to nearly sterilize as contrasted to pasteurizing the sludge thereby killing all of the bacteria both undesirable and desirable. With these "add-on" processes usually the principal surviving microorganisms are bacterial spores. Such microbially restricted sludges lose the significant fertility value associated with bioactivity.

When alkaline materials are added to a sludge to raise the pH, a toxicity may exist due to the high pH. When the product is used as a soil supplement in agriculture, particularly at high application rates, there is a risk of over alkalinization of the soil (see FIG. 14) and burning of crops may result. In addition, a high pH (over pH 11) in the soil due to the addition of active alkaline materials containing calcium oxide or metal hydroxides can result in severe damage to microbial populations in surface soils. With most existing (traditional) alkaline technologies it has been required by the USEPA that the pH be maintained above pH 12 to prevent microbial overgrowth and instability. In fact, with the PFRP "add-on" heat processes, the pH is required by the USEPA to be maintained above 12 until the alkaline treated sludge is land applied. This requirement is based upon the recognition that when such sludges fall below pH 11 noxious odors will develop. U.S. Pat. No. 4,902,431 column 2 line 58–67 states: "In January 1979, the EPA published a Wastewater Sludge Manual (EPA 625/1-79-001) titled 'Process Design Manual for Sludge Treatment and Disposal' which states: 'Lime stabilization is a very simple process. Its principal advantages over other stabilization processes are low cost and simplicity of operation . . . lime addition does not make sludges chemically stable; if pH drops below 11.0, biological decomposition will resume producing noxious odors.'"

In addition, the high pH triggers the release of volatile ammonia nitrogen from the sludge which also is toxic and results in the loss of valuable nitrogen from the potential agricultural product. Further, the toxic nature of ammonia, i.e., to human and animal mucus membranes has been described as well as its lethal activity on microorganisms (see Meehan et al 1988 U.S. Pat. No. 4,793,927). Although having ammonia present during sludge stabilization processing is highly desirable for microbial control, it is not desirable following treatment when the sludge product usage and exposure to the public is likely.

If these toxic stresses and the residual odor in a sludge product could be reduced upon demand, then opportunities for utilization of alkaline sludge products by the public and private sector would increase. This result would be favorable to increased emphasis on resource recovery of the value inherent in municipal sludge material.

The USEPA has evaluated lime stabilization (EPA 600/2-78-171; EPA 670/2-75-012; and Farrell et al., 1974) and has established the cost effectiveness, simplicity, and high level of performance of lime stabilization, particularly PFRP alkaline processes for wastewater sludges. The process of U.S. Pat. Nos. #4,781,842; 4,902,431 requires a drying period which is usually effected by a windrowing process and results in a product that is above pH 12 and, if produced from an anaerobically digested sludge, emits significant amounts of ammonia. However the processes substantially reduce the emission of ammonia by aeration (such as windrowing) but to do so the processes are taking 3 to 10 days to prepare the product for storage or market. As evidence of health concerns over ammonia, states such as Ohio, New Jersey and California have implemented air quality standards regulating the emission of ammonia from industrial sites. Recently other alkaline treatment processes such as the RDP Company's Envessel Process (trademark)—(U.S. Pat. No. #5,013,458) using high amounts of CaO and heat above 70° C. for 30 minutes have been approved by the USEPA as PFRP, however these sludge products made by these processes have been required by the USEPA in 1990 to be maintained at a pH of 12 or above for stability and inhibition of odor development. This USEPA policy prevents these alkaline treated sludges from developing a stabilizing and enriching micro flora, causes them to emit excess ammonia and requires the sludge to be maintained in a high alkaline condition with substantial toxic hydroxide present that is detrimental to direct application to soils and crops. It is also significant with regard to the proposed invention that traditional alkaline stabilization is still being used as PSRP treated sludges may still be land applied. Other more refined PSRP treatment processes such as the Chemfix (trademark) of Chemfix Technologies, Incorporated Process (U.S. Pat. No. 3,837,872) are also being used in various municipalities. Both of these processes could be modified to a sterilization or pasteurization process by the inclusion of additional calcium oxide [U.S. Pat. Nos. 4,270,279 (sterilization) and 4,781,842; 4,902,431 (pasteurization)]; and then subsequently stabilized as taught by the present invention or they can be stabilized using the present invention without achieving PFRP levels of disinfection.

It is fact that when alkaline materials are added to municipal sludges in sufficient mass to raise the pH to at least 11 and often to over 12 that several toxic stresses occur that may affect the disposition of the treated sludge material (EPA 600/2-78-171). For example, the high pH itself may preclude the product use in certain agricultural settings; in addition, the high pH triggers the release of volatile ammonia which itself is toxic and, of course, represents the loss of valuable nitrogen from the potential agricultural product. The toxic nature of ammonia, i.e., to human and animal mucus membranes has been described as well as its lethal activity on microorganisms (see Meehan et al. 1988, U.S. Pat. No. 4,793,927). Although having ammonia present during sludge stabilization processing is highly desirable, it is not desirable following treatment when sludge product usage and exposure to the public is likely. If these toxic stresses could be reduced upon demand then opportunities for alkaline sludge utilization by the public and private sector would increase. This result would be favorable to increased emphasis on resource recovery of the value inherent in municipal sludge material. The present invention not only significantly reduces the ammonia emissions from treated product it also allows for any ammonia product during processing to be collected and scrubbed from the air (see FIG. 9) resulting in an environmentally clean operation.

Time is also important in processing and in determining the use of sludges in various markets. The invention described herein would allow containment of the total process operation thereby facilitating emissions control as discussed above and would shorten the time necessary to produce sludges which will maintain stability under any climatic condition.

In U.S. Pat. Nos. 4,781,842 and 4,902,431 Nicholson and Burnham teach the significant advantages of adding accelerated drying by aeration to alkaline treated sludges to achieve odor reduction and control. When windrows are used, this Nicholson and Burnham process commonly takes between 3 and 10 days to effect the aeration/drying. The present invention provides a faster method of accomplishing same.

Sontheimer (U.S. Pat. No. 3,345,288) in 1967 showed that $CO_2$ could be used to neutralize a watery sludge (1.5 to 4.5% solids) so that it could be dewatered more efficiently. He does not teach the neutralization of sludge cakes for the purpose of increased stability. Further, Roediger (U.S. Pat. No. 4,270,279) points out that "the $CO_2$ in the air may also react with the lime so that the outer surfaces of the particles in the bulk matter of the sludge become rigidified". He also failed to recognize or teach the conditioning step to preparing the sludge for the development of a microbial population that is responsible for long term stability. Wurtz (U.S. Pat. No. 4,997,572) described a very similar process wherein the granulating ability of gaseous $CO_2$ was important in their sludge pelletization process.

These three patents: 1) fail to recognize the detoxifying abilities of carbonated treatment of alkaline sludges; and most importantly, 2) do not recognize that reduction of the pH of the treated sludges will have a major beneficiating influence on the ability of seeded or indigenous micro flora to establish an ecologically active population. This microflora is critically significant to long-term sludge stability because of its ability: a) to enhance by its own metabolism the carbonation of any residual hydroxides or likewise the catabolism of unstable organics; b) to reduce sludge odors and produce a soil-like odor; and c) to prevent the regrowth of pathogenic microorganisms.

Another type of sludge that presently is causing a variety of problems to society with regard to proper disposal or use is a broad group of bioorganic sludges. These substances include organic sludges comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products; sludges resulting from the growth of microorganisms for the production of chemicals and organics, industrial sludges and byproducts resulting from the production of microbial products and foodstuffs, sludges resulting from the animal slaughter industry—particularly if these are digested or otherwise broken down by microorganisms. The sludge material to be stabilized as per the treatment described in the present invention also includes sludges derived from industrial products and byproducts that are comprised in the majority microbially degradable organic materials not of biological or microbiological origin. This includes sludges comprised of recycled organic products such as recycled paper and paper products. The most common procedure for disposal is to landfill them thereby wasting their organic value and essentially delaying proper treatment for another generation. The second most common procedure is to land apply them without further stabilization. This is significant for two reasons: one, these bioorganic sludges will usually provide an excellent substrate for anaerobic bacterial metabolism resulting in the creation of noxious odors and community problems, and two, these sludges without stabilization will create runoff problems with non-point source discharge pollution. This stabilization will delay entry of the nitrogen into the ground water both avoiding contamination and allowing longer access for crops to the nitrogen in the stabilized sludge product resulting from this invention.

Among the objectives of the present inventions are to provide a method of treating and stabilizing bioorganic and/or wastewater sludges rapidly to provide a beneficiated soil or fertilizer; which method can be utilized to heat and stabilize untreated sludge or previously treated sludges, including for example, PSRP or PFRP sludges.

SUMMARY OF THE INVENTION

In accordance with the invention, the process comprises the steps of treating and stabilizing a dewatered unprocessed sludge, i.e., raw sludge, or bioorganic sludges or further treating wastewater sludges after they have been dewatered and processed to a PSRP level or preferably pasteurized or sterilized level so that they achieve the US Environmental Protection Agency's PFRP standard for pathogen reduction, mixing the sludge with an adsorbent material to effect odor reduction and accelerate the achievement of granularity, adjusting the conductivity to a range greater than 5 mmhos but less than 30 mmhos, adjusting the pH of the sludge to a range of between 7 and 9.5, and seeding the sludge, if necessary, so that a soil-like microflora develops. This treatment enables subsequent catabolism of unstable organics and further reduces and controls the long term odor of the treated sludge mixture so that the product odor develops a soil-like intensity and prevents the regrowth of pathogenic microorganisms and maintains stability in the sludge mixture. Additionally, the sludge product may be mixed with between 1 to 5 percent of activated carbon to further remove odor from the product and to enhance the dark coloration of the final mixture. This beneficiating treatment will also have the desirable effect of significantly reducing the emission of ammonia nitrogen from the treated sludge product. The resultant bioactive product is useful as a soil substitute or as a fertilizer. This invention describes a complementary process for traditional alkaline stabilization including the alkaline sterilization and pasteurization processes that minimizes ammonia generation while simultaneously drying the sludge to levels above 50% solids and that develops a technique for reducing the overall time of processing for optimal stabilization. A key objective of this invention is to enhance soil-like physical characteristics of the treated product, as opposed to pelletization, so that drying and odor control are achieved under conditions that allow the survival of an indigenous or seeded microflora.

The present invention requires that an adsorbent material be mixed into the sludge to bind odorant organics and inorganics from the sludge. If this has been previously carried out as part of an earlier treatment process this step may be omitted but if the sludge does not contain an adsorbent material comprising not less than 30% of the wet weight, it must be so processed using a material comprised of cement kiln dust, lime kiln dust, fluidized bed ash, lime injected multistage burner ash, dry sulfur scrubbing residue, slag fines, pulverized calcium carbonate, fly ash, or a combination thereof.

The present invention involves the method of adjusting the conductivity to a level greater than 5 mmhos and less than 30 mmhos by adding a material selected from the group of adsorptive materials comprising cement kiln dust, lime kiln dust, fluidized bed ash, dry sulfur scrubbing residue, slag fines, pulverized calcium carbonate, fly ash, gypsum, or a combination thereof. If the sludge had already been treated with an adsorptive material then the conductivity can be adjusted with salts such as sodium chloride, potassium chloride, calcium chloride or ammonium sulfate or a combination thereof. This mixture is then pH adjusted. An acidic sludge is adjusted to a pH range of between 7 and 9.5 by blending in a material selected from the group comprising cement kiln dust, lime kiln dust, calcium oxide, calcium hydroxide, fluidized bed ash, dry sulfur scrubbing residue, slag fines, bicarbonate pulverized calcium carbonate, fly ash, gypsum or any combination thereof. An alkaline sludge (pH greater than 10) is then adjusted to a pH range of between 7 and 9.5 with a concentrated acid such as nitric, hydrochloric or phosphoric acid, with sodium bicarbonate or ammonium sulfate, with a mineral soil or dredging containing clay minerals containing aluminum ions, carbonates, bicarbonates and/or phosphates, alum, alum sludge, yard waste particularly grass clippings, and/or optionally, to treating the sludge mixture with a flowing air over an alkaline treated sludges in a mixing apparatus, and/or with a flowing $CO_2$ containing gas used as above.

If the treated sludge at this point has not granulated it may be processed through a dryer mechanism (see FIGS. 9 and 13) to remove water. If the sludge was originally not of a PFRP quality it could be heated to near sterilization conditions, i.e., above 85° C. for several minutes by simply increasing the heat input to the dryer medium above to achieve PFRP prior to being further processed for microbial content.

An indigenous microflora surviving a pasteurization process will be enhanced by the above pH treatment and will grow to a level which will effect the beneficiating activities of enhancing the carbonation of any residual hydroxides, the catabolism of unstable organics and the ability of this increased microflora population to prevent the regrowth of pathogenic microorganisms. Alternatively a sterilized sludge or a sludge deficient in beneficial microorganisms must be seeded directly with a soil, the aged soil-like product of this invention, and/or a controlled microbial culture so that the sludge product of this invention will contain an indigenous microflora. This microflora should be within the range of about $10^6$ to $10^{10}$ aerobic bacteria and about $10^4$ to $10^7$ fungi per gram soil solids and the bacteria added to the sludge mixture are selected from a list representing the indigenous bacterial and fungal micro flora of agricultural soils and wherein the bacteria added may include members of the actinomycete class of bacteria. Additionally, further odor control may be effected by adding between 1 and 5 percent activated carbon into the treated sludge which would have the added beneficiating effect of providing a darker color to the treated product. The final resultant stabilized sludge product should contain greater than 50% solids and is allowed to mature for a minimum of 1 day prior to utilization. The resultant product has soil-like properties in that it is granular, has a soil-like odor, has an enhanced useful nitrogen fertilizer value over high alkaline treated sludges and a microbial population that will facilitate odor control, long term stability, prevention of pathogen regrowth and increased fertility value.

This invention relates to a method of treating wastewater sludge designed to detoxin, stabilize and beneficiate the sludge so that it can be safely used as a soil or applied as a fertilizer in agriculture. The present invention teaches that [two] additional waste products, yard waste, green waste and alum sludges, may be used as reagent components for the stabilization of wastewater sludges. This invention also teaches that a bioorganic and/or wastewater sludge product treated in the manner of the present invention may be used as a beneficiating agent for the purpose of reducing odors during the process of yard waste composting. If additional odor reduction is desired, particularly in a freshly made sludge product this can be accomplished by the blending of a small amount of activated carbon, e.g., 2%.

DESCRIPTION

This invention relates to a method of treating bioorganic and/or wastewater sludge designed to detoxify, stabilize and beneficiate the sludge so that it can be safely used as a soil or applied as a fertilizer in agriculture.

In accordance with the invention, a method of treating bioorganic and/or wastewater sludge to provide a stable product for use as a beneficial soil or fertilizer for agricultural lands comprises the steps of; treating the bioorganic and/or wastewater sludge with a highly adsorbent material so that odorant sludge organics and inorganics are bound to the adsorbent particles, adjusting the pH so that it is in the range of 7.0–9.5, adjusting the conductivity of the sludge mixture such that it is raised to between 5 and 30 mmhos, adjusting the solids to a minimum of 50%, thereafter treating the sludge, if necessary, because of the absence of a sufficient microflora, with a soil or an aged sludge product of this invention or a microbial culture so that the normal micro flora of the soil, the sludge product or the culture is seeded directly into the sludge mixture, and permitting the sludge mixture for a time sufficient to allow the microbial population under influence of the conductivity range to establish and to commence catabolizing the organics present in the sludge, to continue the odor reduction initially begun by the addition of the adsorptive material, to prevent pathogen regrowth, and to continue to carbonate any residual calcium hydroxide or oxide components. The method further optionally includes the steps of treating the sludge with activated carbon to further reduce the odor. The sludge treated may be raw sludge, bioorganic sludge or PSRP or PFRP sludge.

Figure 1:
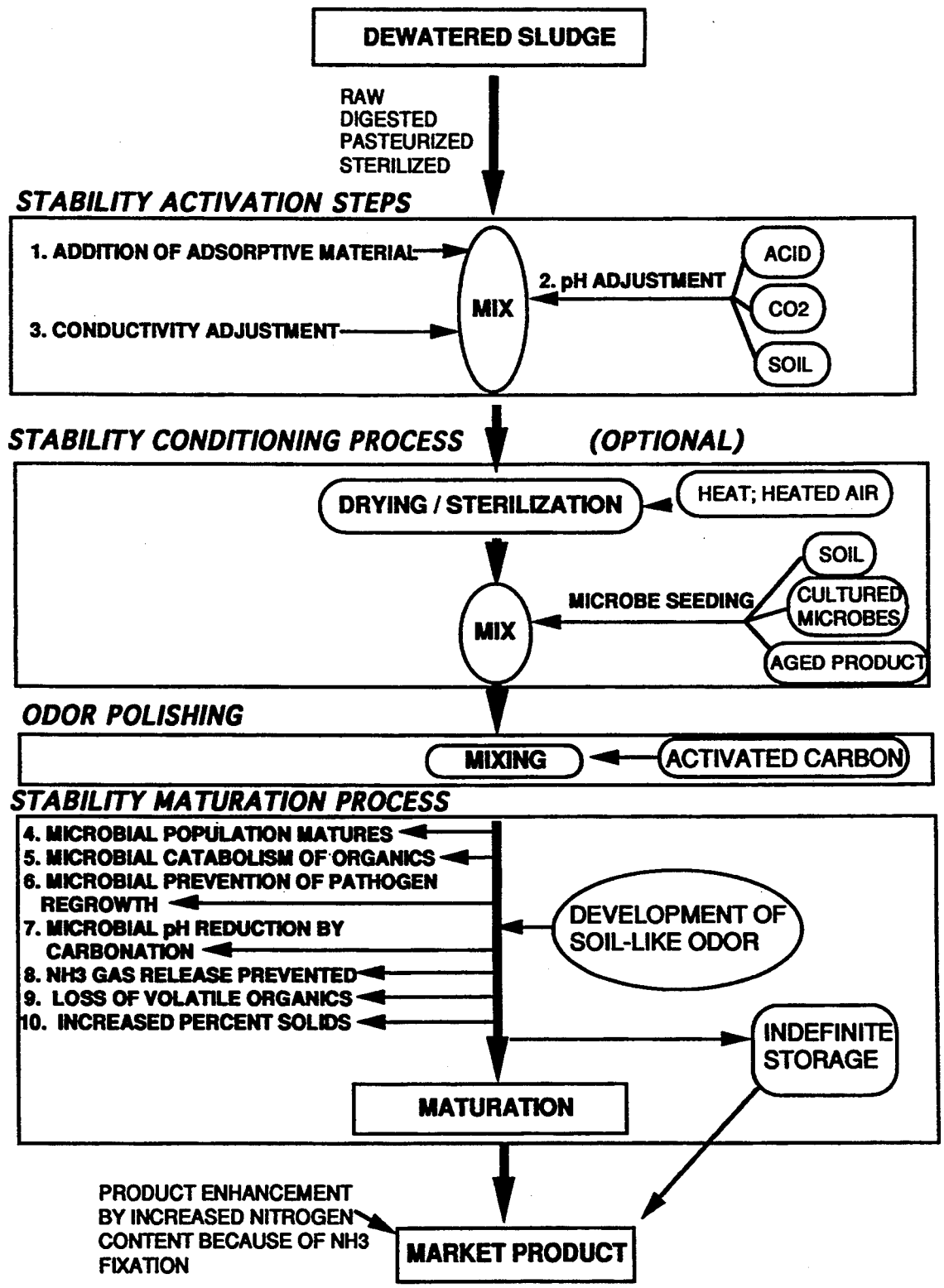
FIG. 1 shows an overall scheme for the invention described herein. The sections of the scheme highlighted in gray are the specific processing steps that carried out in sequence will teach the production of an indefinitely stabilized sludge.

In accordance with the invention, as illustrated in FIG. 1, the process comprises the steps of further treating bioorganic and/or wastewater sludges after they have been dewatered (raw) and either processed to a PSRP level or pasteurized or sterilized level so that they achieve the US Environmental Protection Agency's PFRP standard for pathogen reduction, by treating the sludge with an adsorbent material, e.g., CKD or fly ash to a level of between 30% and 60% of the wet weight of the sludge by adjusting the conductivity to a range greater than 5 mmhos but less than 30 mmhos, by adjusting the pH of the sludge to a range of between 7 and 9.5, by further drying the sludge, if necessary, by heating which if the sludge is not of PFRP quality be carried out so that the sludge is brought to a temperature greater than 85° C. for several minutes, by seeding the sludge, if necessary, so that a soil like microflora develops and by effecting additional odor control by the addition of 1–5% activated carbon to the sludge mixture. This enables subsequent catabolism of unstable organics and further reduces and controls the long term odor of the treated sludge mixture so that the product odor develops a soil-like intensity and prevents the regrowth of pathogenic microorganisms and maintains stability in the sludge mixture. This beneficiating treatment will also have the desirable effect of significantly reducing the emission of ammonia nitrogen from the treated sludge product. The product is useful as a soil substitute, an agricultural limestone substitute or as a fertilizer. FIG. 1 additionally shows that this invention essentially operates in three phases, and "activation" phase where additions to the sludge are made, a "conditioning" phase where drying to increase solids percentage is conducted and the indigenous microflora is inoculated and finally a "maturation" phase wherein the treated sludge achieves stability.

Figure 2:
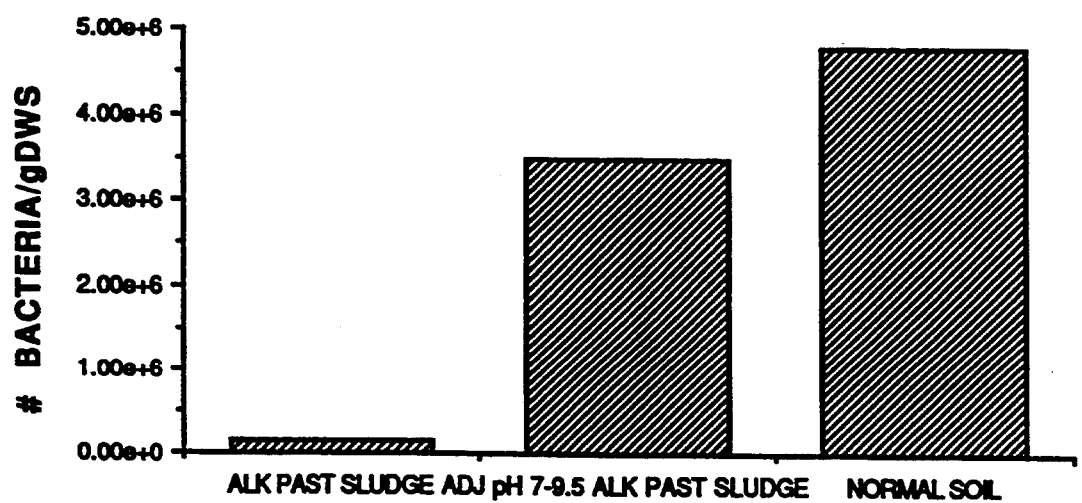
FIG. 2 shows a bar graph illustrating that the carbonation of a freshly pasteurized sludge allows the microbial population to increase significantly to levels that are within the range for normal soils.
Figure 3:
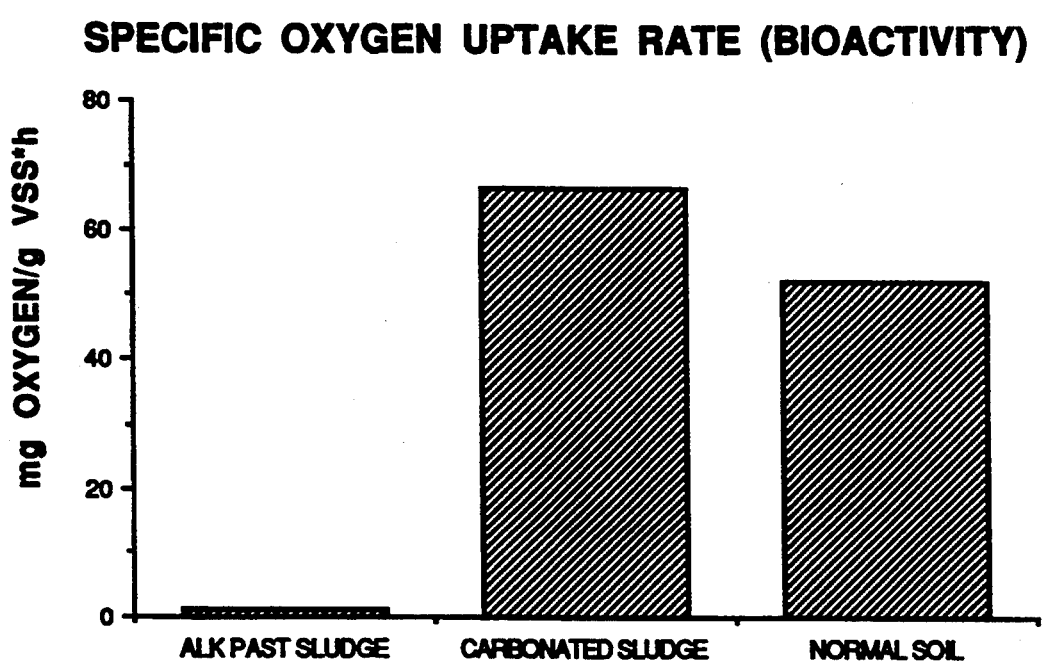
FIG. 3 shows the bioactivity as illustrated by the specific oxygen uptake rate of a carbonated alkaline pasteurized sludge to be very similar to that of a freshly sampled agricultural soil (upper 6 cm) and significantly higher than a sludge that was freshly pasteurized by alkaline treatment with calcium oxide and kiln dust.

The importance of a pH adjustment of the treated sludge is illustrated by FIG. 2. In this figure a alkaline pasteurized sludge contained very little microflora at its inherent pH 3 days after manufacture, however when that same sludge was adjusted to a physiological tolerant range of pH 7 to 9.5 the microflora was able to rapidly increase to over 1 million per gram dry weight sludge (gDWS). FIG. 3 teaches that an alkaline pasteurized sludge, normally found at a pH greater than 12 shortly after production, after adjustment by exposure to carbon dioxide possessed approximate bioactivity exhibited by a surface agricultural soil. This bioactivity is important to its soil fertility value.

Figure 4:
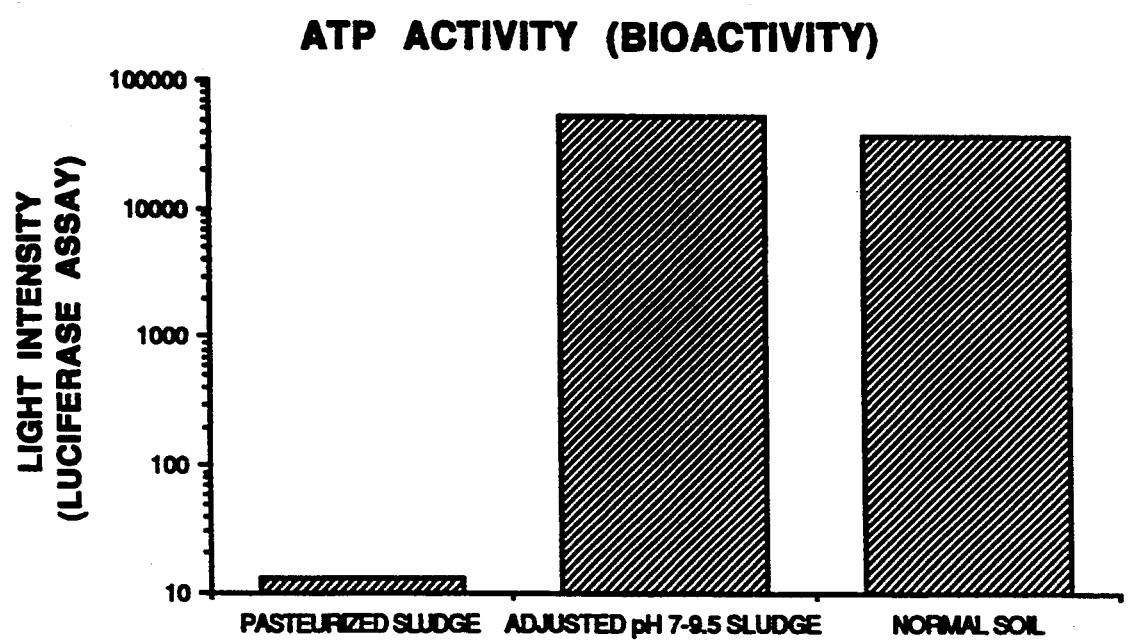
FIG. 4 shows the classic bioactivity measurement employing ATP levels in a mass as an indicator of microbial activity. This bar graph illustrates the carbonated sludge to be very close to a freshly sampled agricultural soil.

The enhanced soil-like bioactivity of a pH adjusted sludge over a freshly produced alkaline pasteurized sludge is also shown in FIG. 4 when the parameter of ATP (Adenosine Triphosphate) levels was measured with the luciferase assay.

Figure 5:
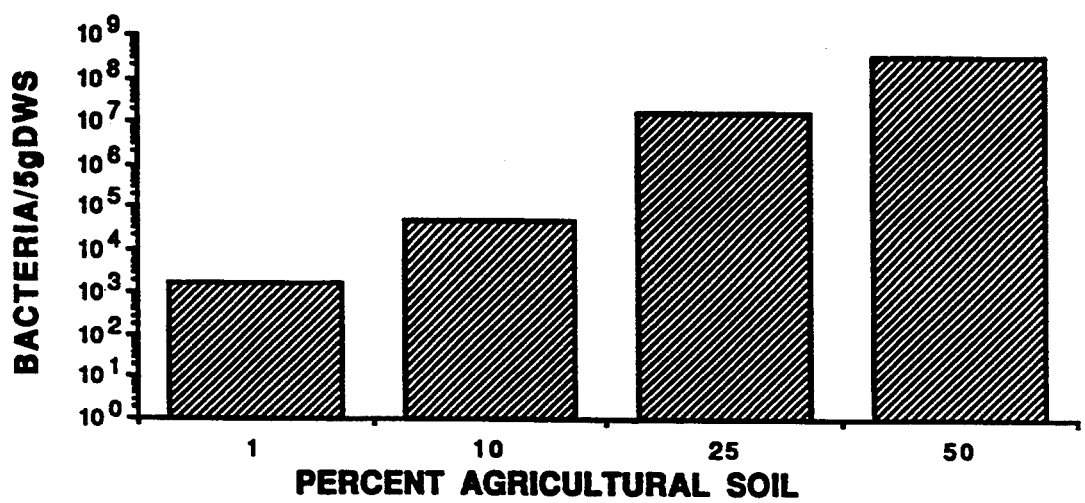
FIG. 5 shows the bioactivity of a freshly pasteurized sludge to be significantly enhanced by the seeding of a micro flora by the blending in of an agricultural soil.
Figure 6:
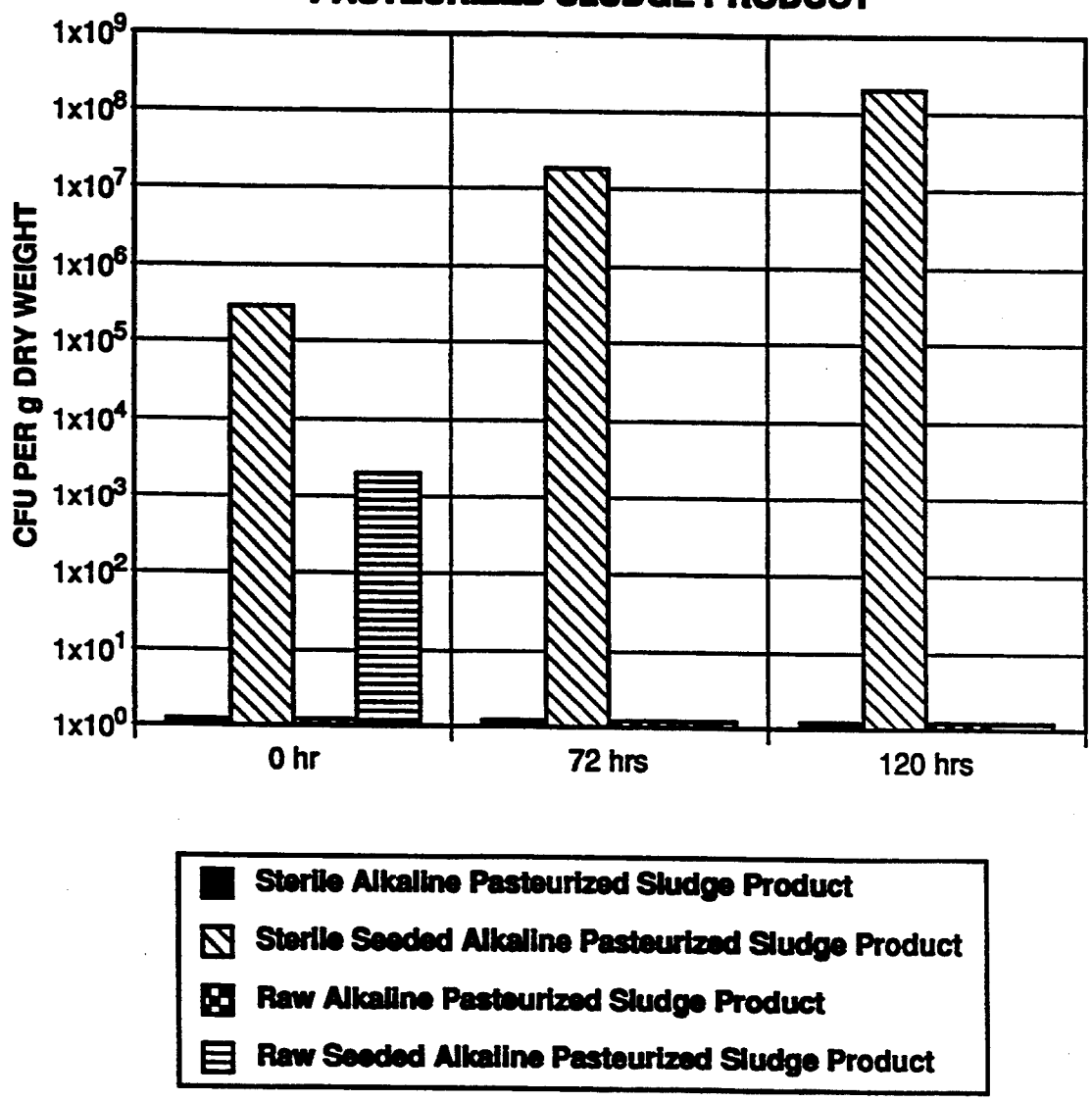
FIG. 6 shows that the seeded microbial community developed in a treated sludge adjusted to pH between 7 and 9.5 showed effective inhibition of a Salmonella species seeded into the sludge mixture.

FIG. 5 shows that addition of a wide range of percentages (based on wet weight) of soil will successfully introduce a stable microflora into a previously sterilized sludge. This invention teaches that this microflora is extremely important in maintenance of long term stability. FIG. 6 shows that this normal micro flora is very important in preventing the establishment of a pathogenic bacterial population in the treated sludge. This form of stability is consistent with the behavior of a true soil. If a sludge product is to be exposed to the public then this indigenous microorganism type of pathogen control is very important.

Figure 7:
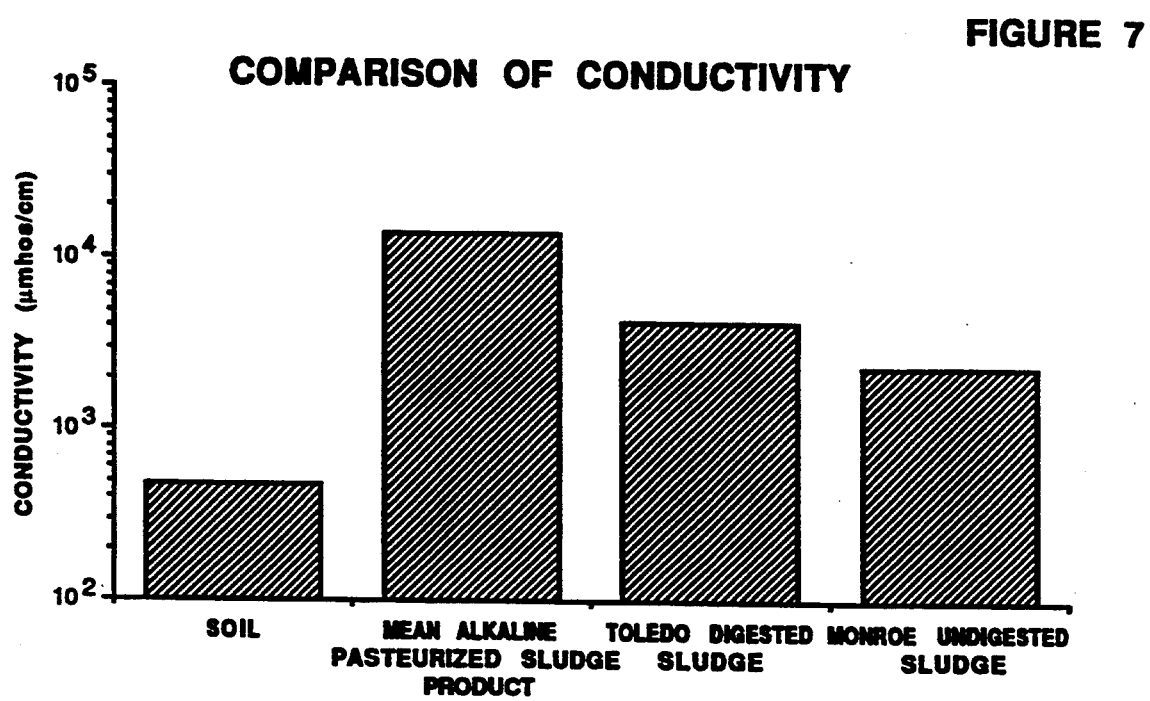
FIG. 7 shows the conductivity desired in a treated sludge mixture as compared to that measured in soil or in raw sludge or anaerobically digested sludge.

FIG. 7 illustrates that conductivity is higher in a stable cement kiln dust alkaline pasteurized sludge produced under the trade name N-Viro Soil (trademark of N-Viro Energy Systems, Limited). This increased salts content over that found in digested sludges and raw sludges is partially responsible for maintaining treated sludge stability in terms of limiting the production of microorganisms in the sludge product to soil-like levels even when more organic nutrients are present as compared to agricultural soil.

Figure 8:
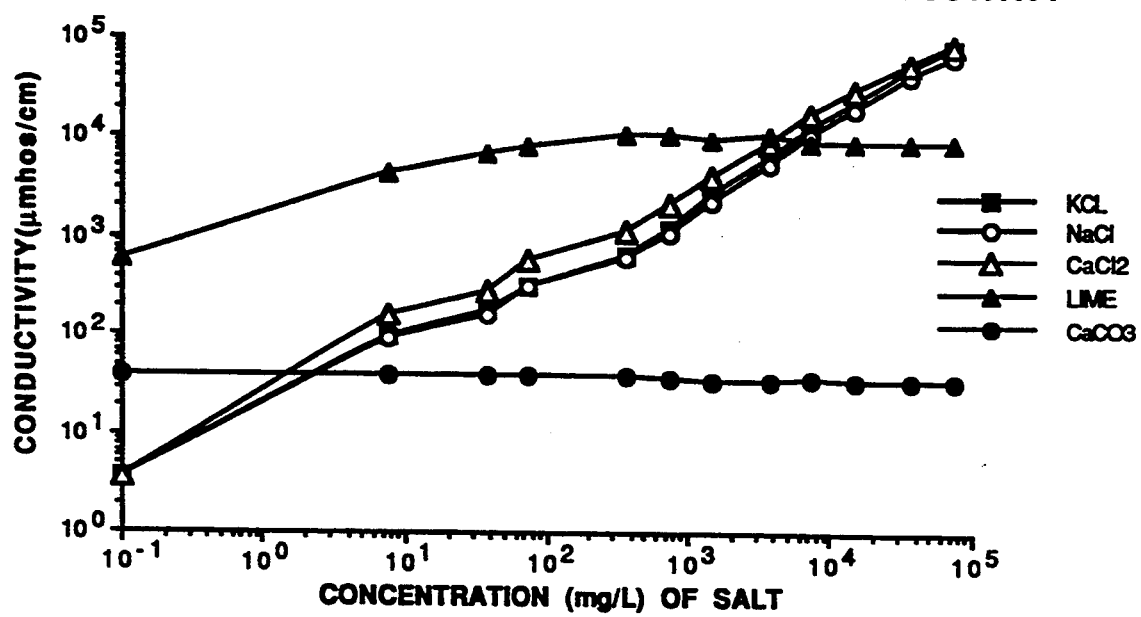
FIG. 8 shows that the desired conductivity level can be achieved by the addition of salts such as sodium chloride or potassium chloride or calcium chloride but not by the addition of calcium carbonate.

FIG. 8 shows that certain salts are superior to others with regard to, by themselves, raising the conductivity of a solution to the desired range of 5000 to 30000 umhos. The important teaching is that $CaCO_3$ cannot raise the conductivity to the desired range. This is significant because the use of this material alone to stabilize sludges will not result in an appropriate level of conductivity for long term stability. Calcium oxide treatment of sludges will, when such treated sludges are exposed to air, result in the calcium oxide and hydroxide being converted to calcium carbonate. FIG. 8 shows this conversion will therefore cause an instability in the final sludge product due to the resultant inadequate conductivity. Loss of this conductivity will contribute to loss of inhibitory control of the microflora population in the treated sludge product.

Figure 9:
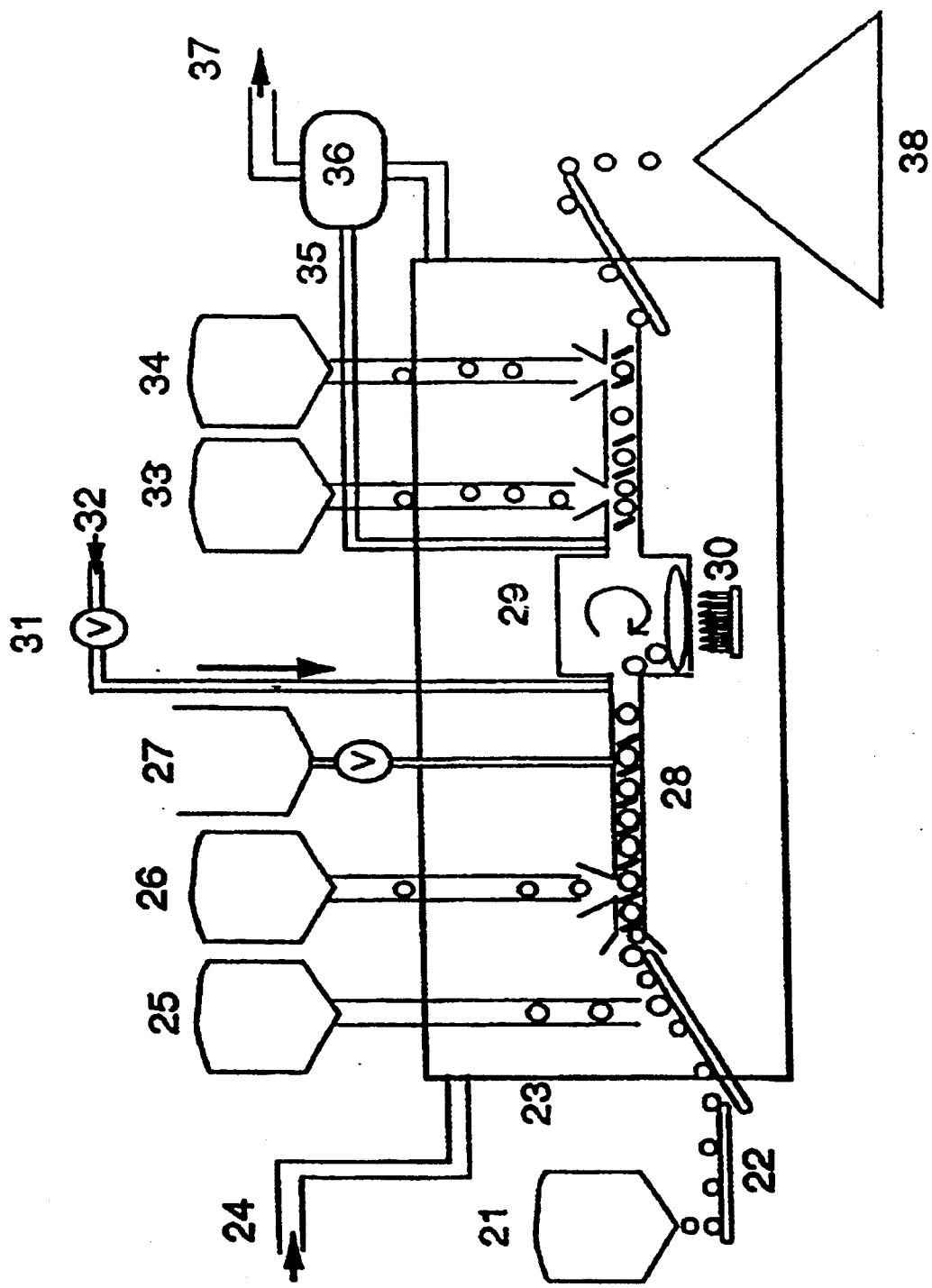
FIG. 9 shows the schematic for this invention.

FIG. 9 shows how the present invention could be deployed to process on a continuous basis an incoming sludge cake. A receiver hopper 21 contains, in the preferred embodiment, a sludge cake of between 12 percent and 30 percent solids. The conveyor 22 transports the sludge into a closed building 23 with controlled fresh air input 24 to an initial mixing apparatus during which the sludge receives the dosage of adsorptive material, e.g. CKD 25 and calcium sulfate 26 which will also raise the conductivity of the sludge to the required range, and a material such as nitric acid source 27 to adjust the pH to within the proscribed range. Following this screw blending 28, the material may be dried by exposure and/or heated to near sterility in an agitating mechanism, such as a drum 29 or conveyor, or dried by passing warmed air (valve 31 from a source 32) through the mechanism. After exiting the drum 27, the microbial addition is either a soil 33 or a bacterial culture or an aged treated sludge which has been treated in the manner of the present invention so that it can, on its own, serve as an inoculum for introduction of an indigenous microflora into the treated sludge. Optionally, the sludge product can be treated with activated charcoal 34 for odor polishing. Finally, the treated sludge product is conveyed out of the building to a stockpile 38 for maturation of a minimum of 1 day prior to shipment or storage. All air and gaseous emissions from both the drum dryer 29 and the building may be scrubbed 36 before clean air is emitted to the environment.

Figure 10:
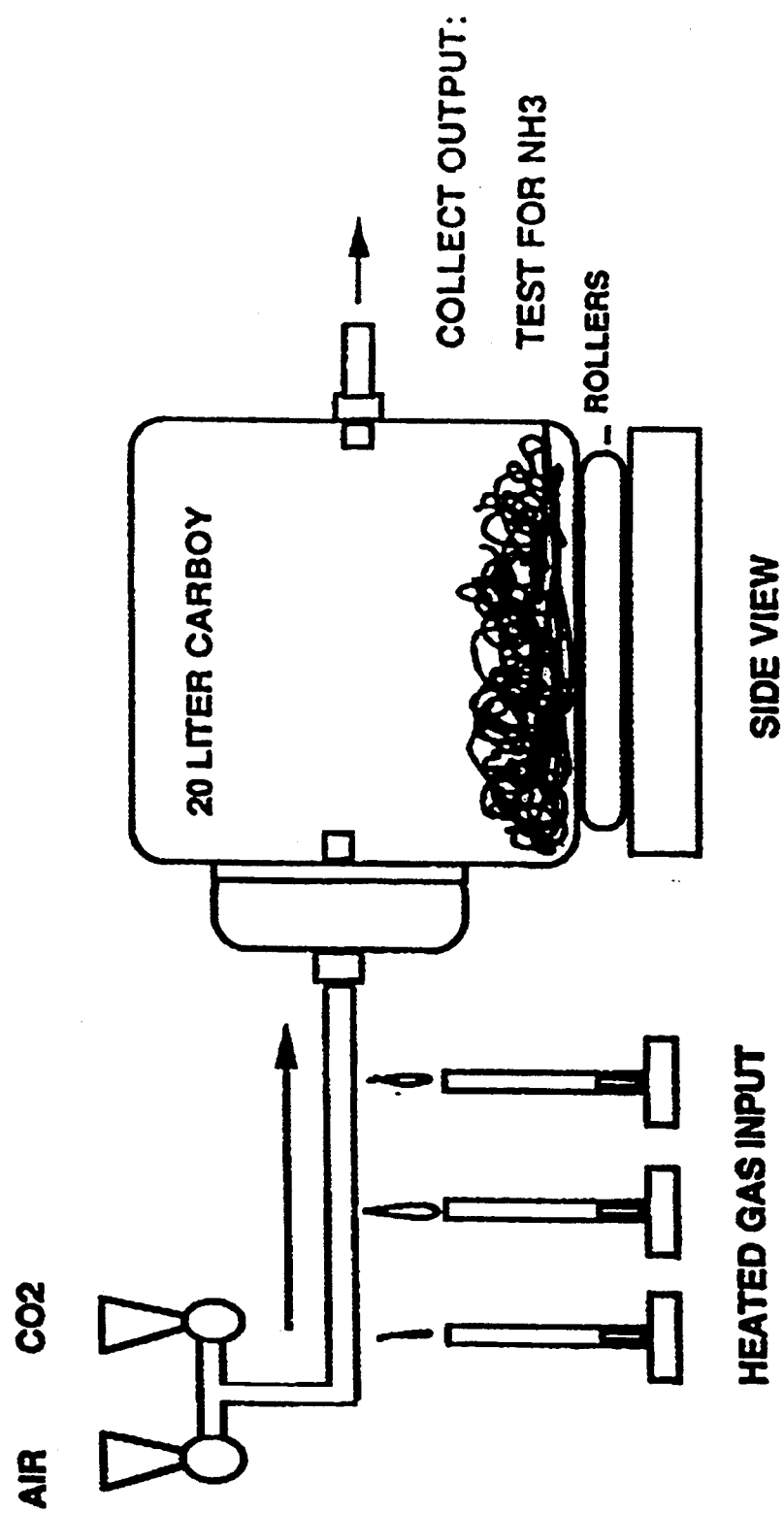
FIG. 10 shows a drawing of the rotating drum (on mechanical rollers) in which treated sludge was exposed to heated or unheated $CO_2$ or air to accelerate the carbonation step.
Figure 11:
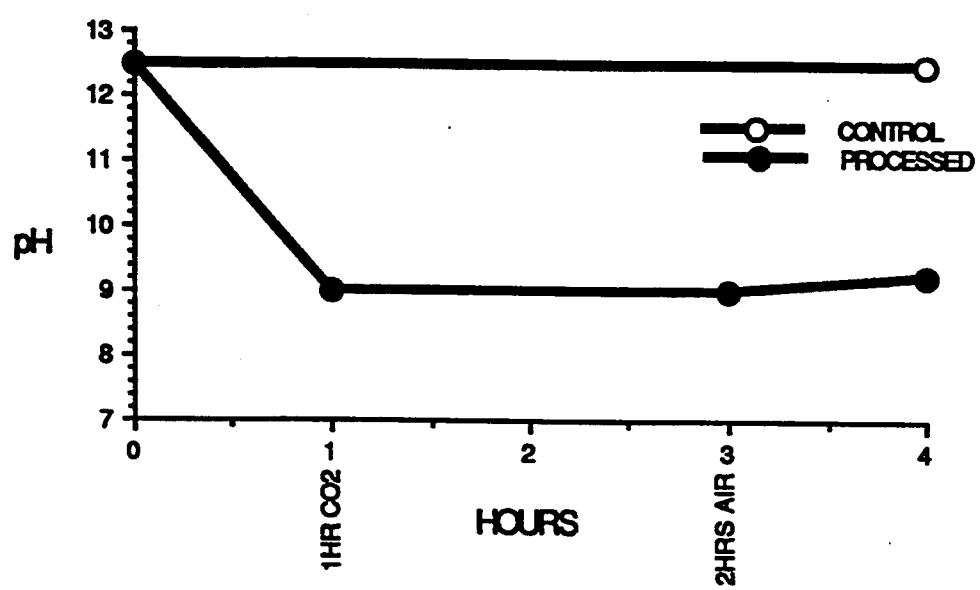
FIG. 11 illustrates the reduction in pH that occurred in an alkaline treated sludge in a rotary drum chamber into which warmed $CO_2$ gas was passed.
Figure 12:
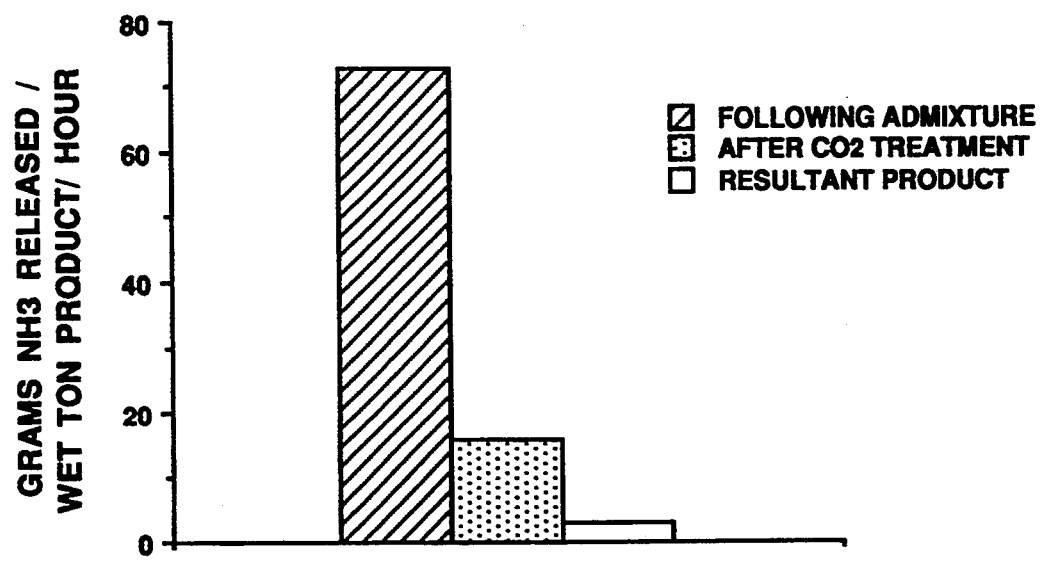
FIG. 12 shows the reduction in ammonia emission that occurred in the alkaline treated sludge product following $CO_2$ treatment in the rotary drum chamber.
Figure 13:
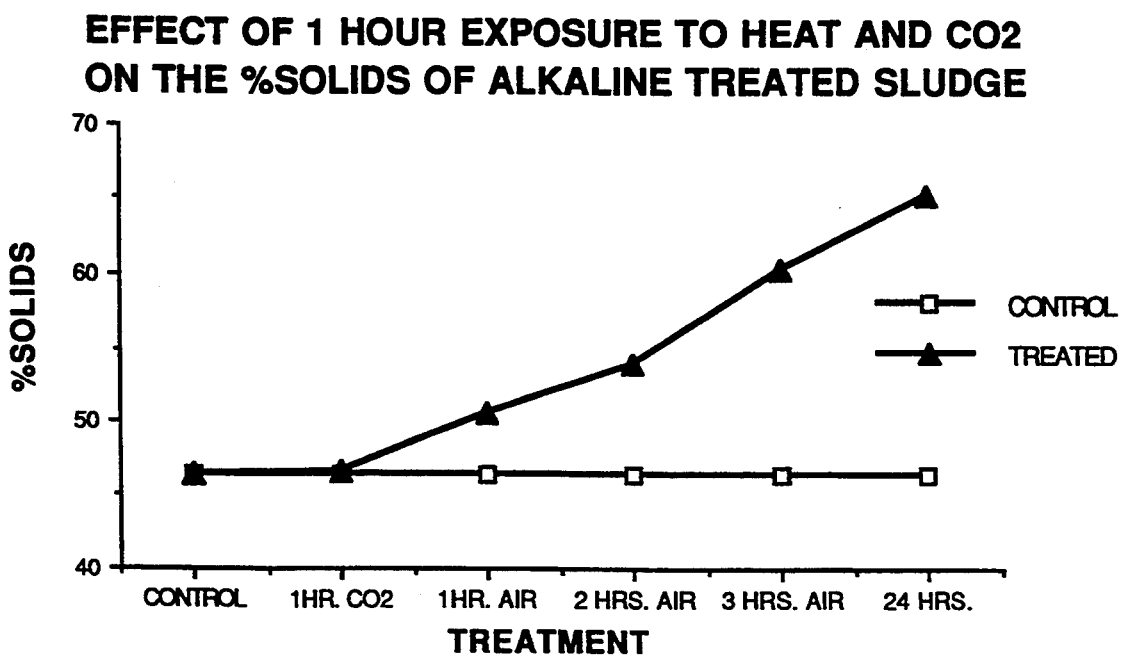
FIG. 13 shows the increase in solids obtained by treating the sludge product in a rotary drum chamber was principally due to the air introduced rather than the $CO_2$.

Recent experiments have shown that if $CO_2$ gas is passed over the surface of an alkaline pasteurized sludge during agitation the pH of the sludge will drop from over pH 12 to a pH of approximately 7 to 9.5. The fact that low level heat could be employed without destroying the seeded or indigenous microbial population led to the proposal that the input gas be heated prior to its exposure to the sludge mixture. Heating of the $CO_2$ and air input gases may be accomplished without the sludge temperature ever exceeding 62° C. The rotating drum processor (FIG. 10) allowed laboratory measurements of pH and percent solids processing with gases and with continuous mechanical agitation. Experiments with this rotary mixer showed that 1 hr of $CO_2$ exposure coupled with two hours of high velocity air caused a high alkaline sludge that had a pH of over 13 to drop to pH 9 (see FIG. 11). This pH is sufficient to block discharge of ammonia from the alkaline pasteurized treated anaerobically-digested sludge cake (FIG. 12) and very little ammonia was detectable after the treatment. A corresponding increase in the percent solids of the drum processed alkaline pasteurized sludge product was also measured (FIG. 13). These results suggest that the $CO_2$ input gas phase of the method caused little drying as compared to that of the air input phase (FIG. 13). This teaching is different from that shown by Wurtz (U.S. Pat. No. 4,997,572) wherein he showed the $CO_2$ to dry the sludge and create a pellet which has a high green strength.

Figure 14:
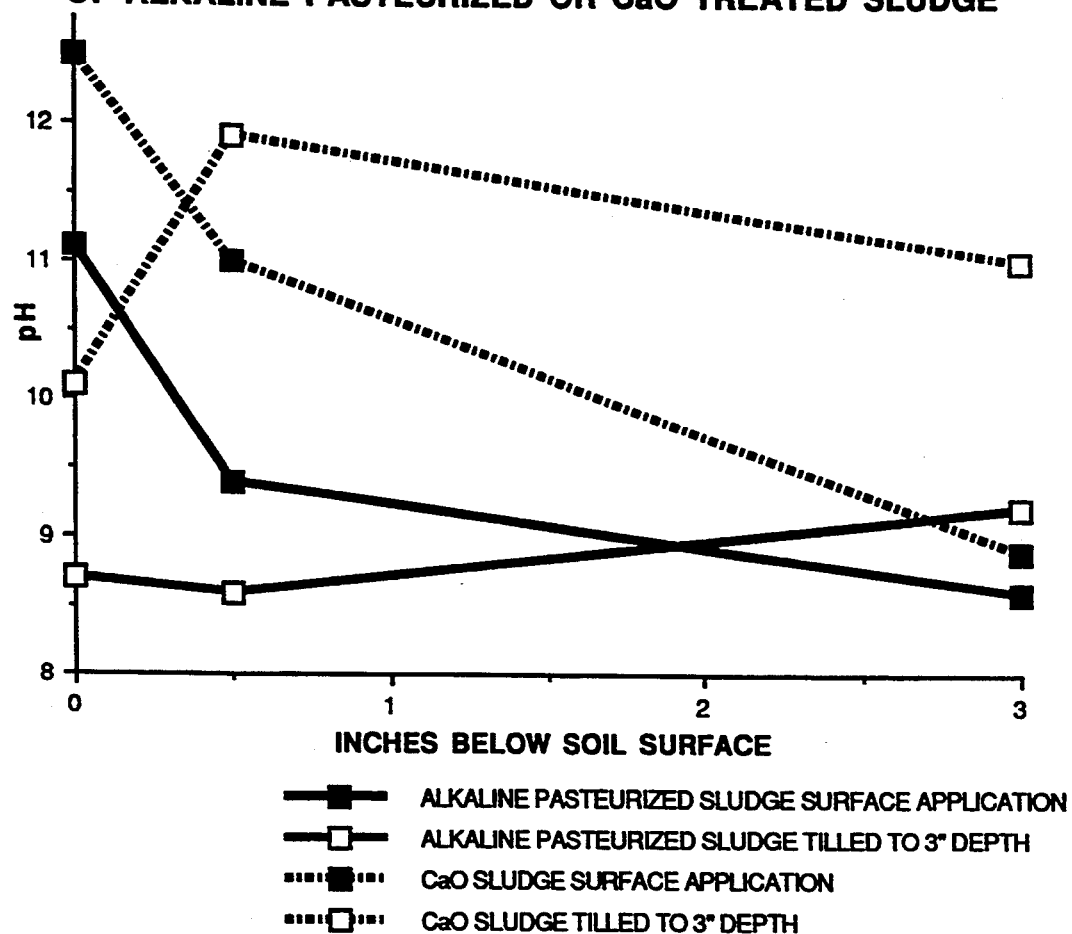
FIG. 14 shows the comparative effects of a six dry ton application of a calcium oxide "add-on" pasteurized sludge or a CKD pasteurized sludge on the pH of in surface soils.

FIG. 14 shows that an alkaline treated sludge containing excess calcium oxide and calcium hydroxide is detrimental to the pH balance of a surface of an agricultural soil. On the other hand, a cement kiln dust treated sludge product applied at the same rate did not cause such caustic pH shifts. Serious damage may be done to soil microorganism populations by excess toxic oxides and hydroxides. Such pH soil elevation significantly minimizes the value of alkaline treated sludge products in agricultural applications.

The significance of these data is that short term continuous pass through processing a previously treated sludge with the addition of a combination of materials to a) adsorb odorant substances; b) raise the conductivity of the sludge mixture; c) adjust the pH between 7 and 9.5; d) to increase the solids content of the sludge mixture to greater than 50% with granulation and e) to seed, if necessary, a soil like microflora from soil or culture could indefinitely stabilize the sludge mixture and could replace up to 10 days of windrowing the traditional alkaline pasteurized sludge and at the same time eliminate significant amounts of ammonia emissions. The resultant product has soil-like properties in that it is granular, has a soil-like odor, has an enhanced useful nitrogen fertilizer value over high alkaline treated sludges and a microbial population that will facilitate odor control, long term stability, prevention of pathogen regrowth and add fertility value.

EXAMPLES

Example 1

A dewatered wastewater sludge (20% solids) is sterilized by a high heat process. This sludge is then to be processed through the present invention for the development of long term stability. This sludge is initially mixed with a highly adsorbent material, e.g., cement kiln dust and/or gypsum to bind the odor causing organics present in the treated sludge. This mixture is then adjusted to a conductivity of greater than 5 but less than 30 mmhos by the addition of one or more of the above materials or the following materials: cement kiln dust, lime kiln dust, fluidized bed ash, dry sulfur scrubbing residue, slag fines, pulverized calcium carbonate, fly ash, gypsum, sodium chloride, potassium chloride, calcium chloride, ammonium sulfate, or a combination thereof. The total amount of material added to this point is usually between 40% and 60% of the wet weight of the sludge. If, after adding the above material, the pH of the mixture is not between 7 and 9.5 , it should be adjusted to that level by adding the necessary amount of an appropriate second material. To raise the pH the material should be selected from the group: cement kiln dust, lime kiln dust, calcium oxide, calcium hydroxide, fluidized bed ash, dry sulfur scrubbing residue, slag fines, pulverized calcium carbonate, fly ash, gypsum, or any combination thereof. To lower the pH, the material should be selected from the group: acids, alum, alum sludge, sodium bicarbonate, ammonium sulfate, yard waste, mineral soil or any combination thereof. If soil was not used in the above mixtures, then it may be used as an inoculum for introducing a soil-like indigenous microflora into the sludge mixture. Research has shown that an inoculum of between 1% and 50% soil will serve as an effective starter for establishment of the microbial population. Alternatively the microbial inoculum may be obtained by adding an aged sludge product of this present invention or by directly adding a selected microbial population produced in culture. Following the blending of the microbial inoculum with the sludge mixture the final sludge product should contain greater than 50 percent solids, should be granular, should be stable independent of climatic conditions and should have achieved an acceptable odor. Additional odor "polishing" can be accomplished by the addition of 1 to 5 percent activated carbon. The final product will mature with time after introduction of the microbes prior to its being utilized as a soil substitute or as a fertilizer. The longer the product is left to mature the more it will resemble soil as the microbial catabolism mineralizes the available sludge organics and improves the product odor to be more soil-like.

Example 2

In this example the sludge to be stabilized has been processed through one of the high heat (>70° C.) calcium oxide pasteurization procedures. Such sludges will retain a reduced microflora predominantly comprised of heat resistant bacterial spore-forming species and not a flora representative of an agricultural soil. In the preferred embodiment, a material appropriate to reduce the pH of the sludge mixture would be selected, e.g., hydrochloric acid, so that any residual calcium oxide or calcium hydroxide remaining from the initial treatment would be neutralized and the resultant pH would be within the range of pH 7 to 9.5. Once the calcium oxide and hydroxide are removed, the invention would next process this sludge by adjusting the conductivity to within the specified range of 5 to 30 mmhos as specified in example 1. Finally, a soil inoculum of 20% by volume would be blended into the treated sludge to provide a stable soil microflora and additional odor adsorption and granulating basis. In the preferred embodiment, 2% activated carbon is blended into the sludge mixture for optimum odor control. This mixture would be left to mature preferably for more than 1 day prior to market.

Example 3

In this example, a raw sludge of 20% solids was processed to stability using the present invention. The sludge was initially mixed with 20% Fly Ash for organic adsorption and 20% gypsum (calcium sulfate) to provide the necessary conductivity. Because gypsum often contains amounts of calcium oxide resulting in a high pH sludge mixture the pH should be reduced to about pH 8.5. In this example, nitric acid was used. This mixture was then heated to 95° C. for 5 minutes in a drum agitator and simultaneously dried to 60% solids by passing heated air through a heated drum. Because this sludge requires a subsequent addition of a soil microflora because of the near sterilizing heat conditions employed, a 10% agricultural soil is blended into the product which serves to adsorb odors, to additionally dry and granulate the now PFRP sludge and to add an appropriate soil micro flora. The optimally adjusted treated sludge is then stockpiled until marketed.

Example 4

In this example a dewatered sludge was treated by the process of U.S. Pat. Nos. 4,781,842 and 4,902,431 but without carrying out the windrow / aeration step that is described in that patent. The pH is next adjusted to pH 8.0 to 9.5 by exposing the treated sludge to a carbon dioxide containing gas as outlined in FIG. 9 above. Then the treated sludge is tested for conductivity level and if low, the conductivity is to be adjusted to the required range (optimally at 14 mmhos) using calcium chloride or one of the alternate materials listed earlier. Such treatment will have the beneficiating property of lowering the pH to a physiological range allowing the surviving microflora to proliferate to soil levels and will eliminate the majority of the ammonia emissions that would occur if the treated sludge were left at its original post treatment pH of 11 or greater. The sludge mixture is blended with 3% activated carbon for additional odor control. The optimally adjusted treated sludge may then be stockpiled indefinitely prior to use.

Example 5

In this example a dewatered sludge was treated by the process of U.S. Pat. Nos. 4,781,842 and 4,902,431 but without carrying out the windrow/aeration step that is described in those patents. After testing and adjusting, if necessary, the sludge mixture for appropriate conductivity, the sludge mixture is adjusted to a pH of 8.5 by adding a small amount of nitric acid and 20 percent by wet weight of a yard waste material and a 5 percent addition of an agricultural soil. The optimally adjusted treated sludge is then stockpiled for an additional day prior to use.

Example 6

In this example, the product of this invention was added as an odor reducing agent to a composting yard waste at the rate of a minimum of 10 percent and preferably 25% of the compost wet weight. Use of lime has been known to reduce odor in composting yard waste but the amount that is possible to add is very limited because of the inhibitory high pH that will develop causing a toxicity to bacteria responsible for composting action. Such a restriction will not be necessary in the use of the product of this invention. In addition to reducing the odors emitting from the compost the addition of the stabilized sludge product to the compost will improve the carbon/nitrogen ratio (elevating the nitrogen thereby lowering the ratio) which enhances the metabolic composting action.

Example 7

In this example, a sludge comprised of a mycelial product residual from the production of an antibiotic by a pharmaceutical firm of 20% solids (22 wet tons) was processed in a demonstration to stability using the present invention. The sludge was initially mixed with 62% lime kiln dust (13.8 tons) for organic adsorption and to provide the necessary conductivity. The lime kiln dust used contained sufficient amounts of calcium oxide to product a pasteurizing heat of 52° C. This treatment resulted in a pH of 12.3 in the sludge mixture which was subsequently reduced to physiological levels by carbonation with atmospheric carbon dioxide. In a laboratory pilot for this process this mycelial sludge-alkaline admixture product was treated with nitric acid to reduce the pH to less than pH 9. Conductivity was increased rom 1.1 to 6.4 mmhos/cm with this treatment. A full scale operation would contain an acid neutralization process as illustrated in FIG. 9. Because this sludge mixture requires a subsequent addition of a soil microflora because the product was the result of an industrial production using a microbial single species, a 10% fresh agricultural soil was blended into the product which additionally served to adsorb odors, to dry and to granulate the now USEPA Class A sludge. The optimally adjusted treated sludge was then stockpiled and stored exposed to the weather.

Example 8

In this example, a sludge comprised of a bacterial production residual (*Escherichia coli*) at 34% solids was processed to stability using the present invention. The sludge was initially mixed with 35% cement kiln dust for organic adsorption, 8% quick lime for pasteurization heat according to U.S. Patent and 10% additional gypsum (calcium sulfate) to provide additional necessary conductivity. This mixture was then dried to 64% solids. The length of treatment may be varied dependent upon the final pH desired for the mixture. Because this sludge requires a subsequent addition of a soil microflora because of the unispecies nature of the original sludge and the absence of a soil microflora, a 10% agricultural soil is blended into the product. The added microflora, measured at $1.2 \times 10^6$ per gram dry wt product, will have the additional advantage of continuing the carbonation process through its production of $CO_2$ from its metabolism in the stabilized sludge product. Because of the balanced ecology created in this adjusted treated sludge, the product can be stockpiled indefinitely until marketed.

Example 9

In this example a sludge comprised of a recycled paper residual made predominantly from newsprint and paper towels was mixed with 35% fluidized bed ash, 8% calcium oxide along with 5% gypsum for granulation and conductivity. Conductivity was increased from 0.4 mmhos for the bioorganic sludge alone to 11.5 mmhos in the product. Drying was carried out by moving the mixture through a gas-heated rotating drum until it reached 68 percent solids. The pH of the product was reduced to pH 8.8 by treating the mixture with a carbon dioxide containing gas in a rotating drum. A broad spectrum of gram-positive and gram-negative microbial flora was introduced by adding fresh agricultural soil at the rate of 5 percent of the weight of the mixed product. The final product had an acceptable odor and was very granular. The material was not easily compactable, was not sticky and could be marketed as an agricultural limestone equivalent or a soil amendment.

I claim:

1. A method of treating bioorganic or raw or treated wastewater sludge to provide a stable product for use as a beneficial soil or fertilizer for agricultural lands comprising the steps of:
   treating the bioorganic or wastewater sludge with a high adsorbent material selected from the group consisting of cement kiln dust, lime kiln dust, fluidized bed ash, lime injection multistage burner ash, dry sulfur scrubbing residue, slag fines, pulverized calcium carbonate, fly ash, gypsum or a combination thereof to provide a sludge mixture, such that odorant sludge organics and inorganics are bound to the adsorbent particles,
   adjusting the pH of the sludge mixture such that it is in the range of 7.0–9.5,
   adjusting the conductivity of the sludge mixture such that it is raised to between 5 and 30 mmhos,
   adjusting the solids to a minimum of 50% and
   adjusting the microflora content within the range of about $10^6$ to $10^{10}$ aerobic bacteria and about $10^4$ to $10^7$ fungi per gram soil solids, if necessary because of the absence of a sufficient microflora, with a soil, a sludge product containing microflora, a microbial culture or mixture thereof, by introducing the microflora of the soil, the sludge product or the microbial culture directly into the sludge mixture; and
   thereafter maintaining the pH range and conductivity range for a time sufficient to allow the microbial population of the sludge under the influence of the conductivity range to establish and to commence catabolism of the organics present in the sludge mixture, to continue the odor reduction initially begun by the addition of the adsorptive material, to prevent regrowth of pathogenic organisms, and to continue to carbonate any residual calcium hydroxide or calcium oxide components to form said stable product.

2. The method according to claim 1 wherein the sequence of steps comprises: (a) initially treating the sludge to achieve dewatering; (b) treating the sludge for pathogen reduction; (c) adjusting the sludge mixture for pH; (d) adjusting the sludge mixture for conductivity; (e) adjusting the solids contents to at least about 50%; (f) adjusting the microflora content by introducing directly into the sludge a microflora from natural soil, or mixture sludge product containing microflora or a microbial culture into the sludge mixture; (g) treating the sludge mixture with activated carbon for additional odor control; and (h) allowing the sludge mixture to mature in static pile to form said stable product.

3. The method set forth in claim 2 including the step of treating the sludge mixture with activated carbon for additional odor control and allowing the sludge mixture to mature in static pile prior to forming said stable product.

4. The method set forth in claim 1 wherein the sludge is raw primary sludge.

5. The method set forth in claim 1 wherein the sludge has been treated to reduce pathogens.

6. The method according to claim 5 wherein the sludge has been initially treated by sterilization.

7. The method according to claim 6 wherein the sludge has been initially treated as follows:
   wastewater sludge containing odor, animal viruses, pathogenic bacteria, and parasites is treated to provide a fertilizer for agricultural lands which can be applied directly to the lands which consists essentially of the following steps:
   mixing said sludge with at least one material selected from the group consisting of lime, cement kiln dust and lime kiln dust to form a mixture,
   wherein the amount of added material mixed with said sludge being sufficient to raise the pH of said mixture to 12 and above for at least one day;
   and drying said mixture to produce a granular material,
   the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacterial therein no less than three colony forming units per 100 ml of said sludge; to reduce parasites therein to less than one viable egg per 100 ml of said sludge; to reduce vector attraction to said sludge; and to prevent significant regrowth of the pathogenic microorganisms.

8. The method according to claim 1 wherein the sludge has been initially treated by sterilization.

9. The method according to claim 8 wherein the material added to raise the conductivity while maintaining an alkaline pH is selected from the group consisting of cement kiln dust, lime kiln dust, fluidized bed ash, dry sulfur scrubbing residue, slag fines, pulverized calcium carbonate, fly ash, gypsum, sodium chloride, potassium chloride, calcium chloride, ammonium sulfate, or a combination thereof.

10. The method according to claim 1 wherein the adsorbent material is added to maintain the pH and to adsorb sludge organics and inorganics and to aid in granulation and is selected from the group consisting of cement kiln dust, lime kiln dust, fluidized bed ash, lime injected multistage burner ash, dry sulfur scrubbing residue, slag fines, pulverized calcium carbonate, fly ash, gypsum or a combination thereof.

11. The method according to claim 1 wherein the material added to raise the conductivity while maintaining an alkaline pH is selected from the group of adsorbent materials consisting of cement kiln dust, lime kiln dust, fluidized bed ash, lime injected multistage burner ash, dry sulfur scrubbing residue, slag fines, pulverized calcium carbonate, fly ash, gypsum, or a combination thereof.

12. The method according to any one of claims 1 and 8 wherein the pH reduction is wholly or partly effected by addition of one or more of the following materials: alum, alum sludge, concentrated acids comprising phosphoric or nitric or hydrochloric, yard waste and agricultural soil or dredgings containing clay minerals containing aluminum ions, carbonates, bicarbonates and phosphates to affect the buffering of the sludge mixture to the required pH range.

13. The method set forth in claim 12 wherein pH reduction and carbonation are enhanced by heating input soil, air or $CO_2$ containing gas immediately prior to its contacting the sludge mixture.

14. The method according to claim 1 wherein the carbonation is wholly or partly effected by addition of a carbon dioxide containing gas selected from the group consisting of carbon dioxide gas, flue gas or emission gases resulting from the combustion of methane or other organic material wherein the carbon dioxide is a major constituent of said flue gas, or emission gases.

15. The method according to claim 14 including the step of heating the sludge mixture to 52° C. to 62° C. during $CO_2$ exposure.

16. The method according to claim 1 wherein the carbonation is effected by an air which contains 0.03% $CO_2$.

17. The method according to claim 1 wherein the sludge comprises an acid sludge which is made alkaline within the range of pH 7.0 to 9.5 by the addition of a material selected from the group consisting of cement kiln dust, lime kiln dust, calcium oxide, calcium hydroxide, fluidized bed ash, dry sulfur scrubbing residue, slag fines, bicarbonate pulverized calcium carbonate, fly ash, gypsum.

18. The method according to claim 1 wherein the microflora added to the sludge mixture includes bacteria produced in controlled cultures and are selected from indigenous bacterial and fungal microflora of agricultural soils.

19. The method according to claim 18 wherein the bacteria added includes members of the actinomycete class of bacteria.

20. The method according to claim 18 wherein the bacteria added to the sludge mixture are obtained from a stored sludge product resulting from the method.

21. The method according to claim 1 wherein the pH is adjusted such that ammonia emissions are reduced from that caused by high alkaline pH of over 10 thereby reducing the odor of the sludge product and increasing the agronomic value of the product as a nitrogen containing fertilizer.

22. A method according to claim 1 wherein the sludge is heated to a temperature of 85° C. or above for at least several minutes.

23. The method set forth in claim 1 by which the product of the method is blended with yard waste at a rate of 10 percent to 25 percent of the wet weight of the yard waste and subjected to composting in order to reduce the odors that emanate from the composting.

24. The method set forth in claim 1 wherein the sludge is initially treated for pathogen control by heating or radiation.

25. The method set forth in claim 1 wherein the sludge is initially treated with carbon dioxide.

26. The method set forth in claim 1 wherein the sludge is a bioorganic sludge.

27. The method set forth in claim 1 wherein the sludge is an organic sludge.

* * * * *